United States Patent
Menjak et al.

(10) Patent No.: US 6,820,713 B2
(45) Date of Patent: Nov. 23, 2004

(54) HAND WHEEL ACTUATOR WITH STEERING-FEEL ENHANCEMENT

(75) Inventors: Ratko Menjak, Frankenmuth, MI (US); James M. Card, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 48 days.

(21) Appl. No.: 10/198,339

(22) Filed: Jul. 17, 2002

(65) Prior Publication Data

US 2004/0011585 A1 Jan. 22, 2004

(51) Int. Cl.[7] ................................................ B62D 5/00
(52) U.S. Cl. ...................................................... 180/402
(58) Field of Search ................................ 180/443, 444, 180/446, 402, 447; 701/41

(56) References Cited

U.S. PATENT DOCUMENTS

| | | | | |
|---|---|---|---|---|
| 4,860,844 A | * | 8/1989 | O'Neil ........................ 180/402 |
| 4,865,144 A | * | 9/1989 | North .......................... 180/402 |
| 5,347,458 A | * | 9/1994 | Serizawa et al. ............. 701/41 |
| 5,889,215 A | * | 3/1999 | Kilmartin et al. ...... 73/862.335 |
| 5,896,942 A | * | 4/1999 | Bohner et al. ............... 180/402 |
| 6,176,341 B1 | | 1/2001 | Ansari |
| 6,481,526 B1 | * | 11/2002 | Millsap et al. ............... 180/402 |
| 6,522,962 B2 | | 2/2003 | Millsap et al. |
| 6,547,031 B1 | | 4/2003 | Magnus |
| 6,548,969 B2 | | 4/2003 | Ewbank et al. |
| 6,575,263 B2 | * | 6/2003 | Hjelsand et al. ............. 180/402 |
| 6,588,540 B2 | | 7/2003 | Graber et al. |
| 6,598,695 B1 | * | 7/2003 | Menjak et al. ............... 180/402 |
| 6,615,947 B2 | | 9/2003 | Ozsoylu et al. |
| 6,655,493 B2 | * | 12/2003 | Menjak et al. ............... 180/443 |
| 6,655,709 B2 | * | 12/2003 | Sherwin et al. ............. 280/402 |
| 2003/0141135 A1 | * | 7/2003 | Menjak et al. ............... 180/402 |
| 2003/0146037 A1 | | 8/2003 | Menjak et al. |
| 2003/0164060 A1 | * | 9/2003 | Menjak ........................ 74/552 |
| 2003/0209381 A1 | * | 11/2003 | Menjak et al. ............... 180/402 |

* cited by examiner

*Primary Examiner*—Lesley D. Morris
*Assistant Examiner*—Daniel Yeagley
(74) *Attorney, Agent, or Firm*—Michael D. Smith

(57) ABSTRACT

A hand wheel actuator for a steer-by-wire steering system having a steering feel that meets drivers' expectations is provided with a housing having an aperture, a steering shaft extending through the aperture and rotatably supported by the housing, an electric motor, a position sensor and torque sensor, and a mechanical steering feel enhancement device. The mechanical steering feel enhancement device is attached to the housing and provides a positive stop function, a return-to-center function, and/or a friction/weight function. The mechanical steering feel enhancement device is in mechanical communication with the steering shaft and may exist as a separate unitary subassembly prior to being installed on the housing. The electric motor has an output shaft that is in mechanical communication with the steering shaft for imparting a torque to the steering shaft.

16 Claims, 6 Drawing Sheets

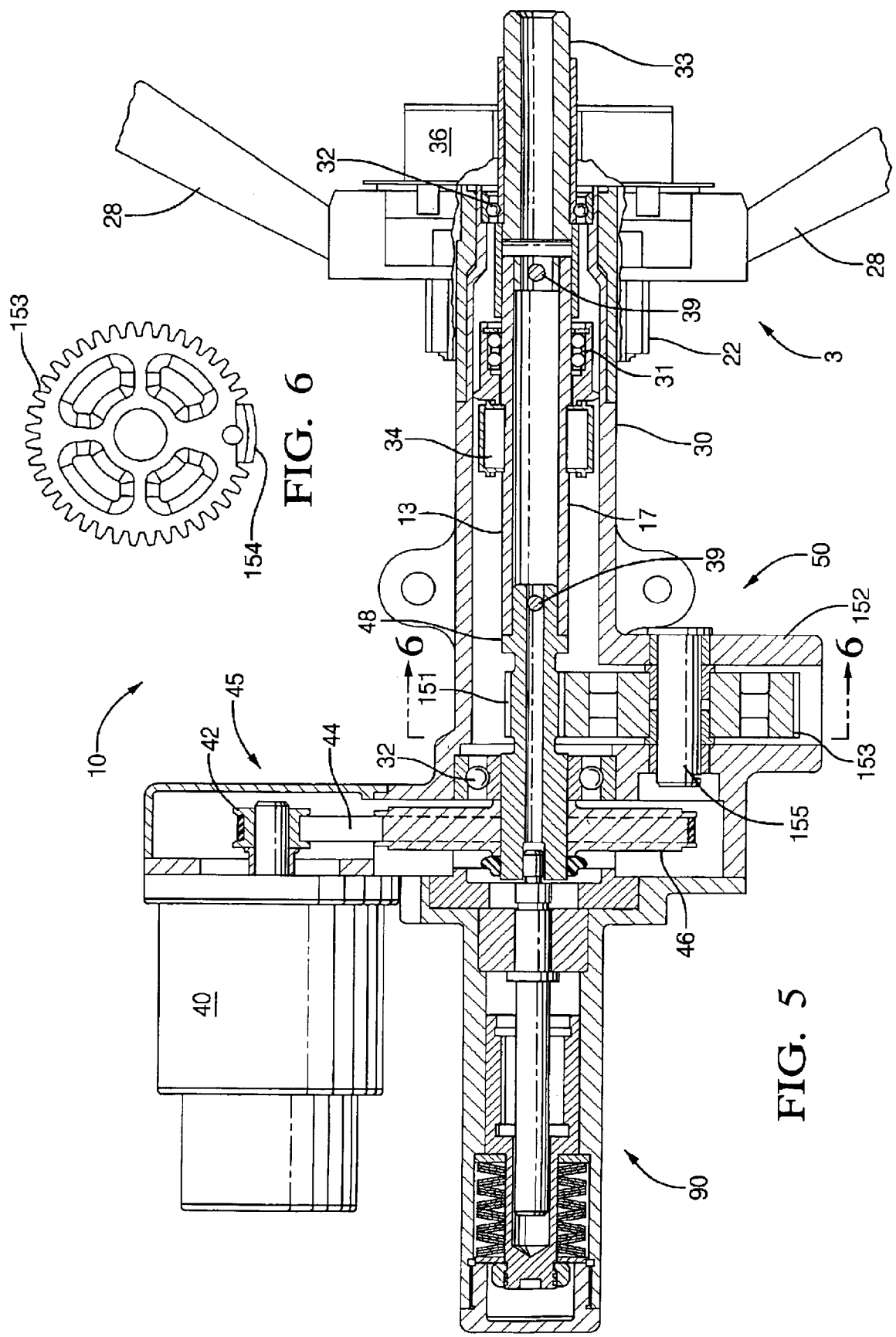

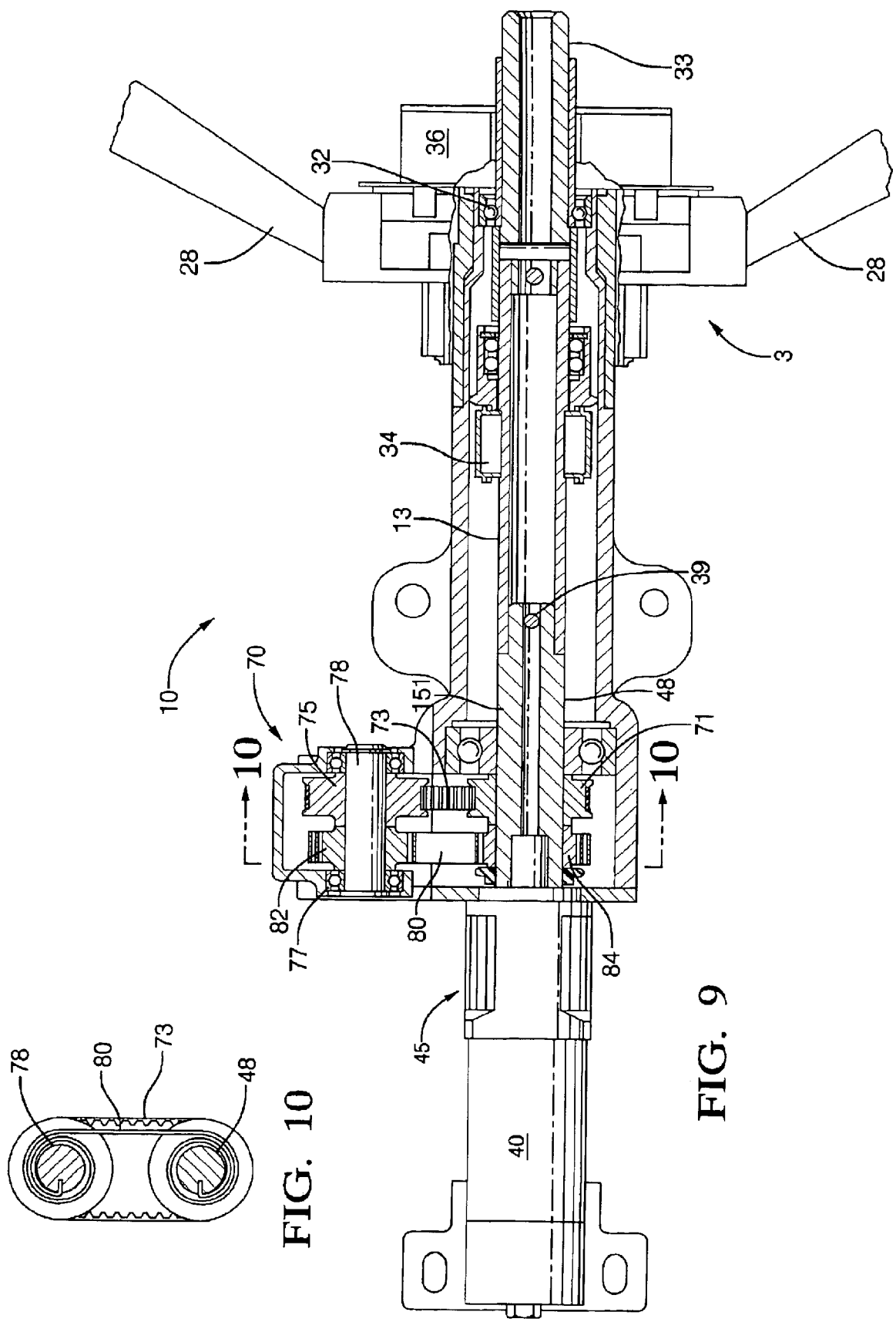

HAND WHEEL ACTUATOR WITH STEERING-FEEL ENHANCEMENT

TECHNICAL FIELD

This invention relates to a hand wheel actuator for a steer-by-wire system of a vehicle.

BACKGROUND

Automobiles are conventionally equipped with a pair of front road wheels that are steered to enable the vehicle to turn left and right as it maneuvers on land. It is also known to provide for steering rear wheels in automobiles. In the past, vehicle steering systems commonly employed a mechanical linkage between the driver-operated hand wheel and the front road wheels of an automotive vehicle. As the driver rotated the hand wheel, a mechanical linkage through the vehicle's tie-rods actuated the road wheels sometimes with the assistance of a power assist steering motor or hydraulic piston.

Recently, steer-by-wire steering systems have been introduced into automotive vehicles to provide road wheel steering function. Included in a typical steer-by-wire steering system is a hand wheel actuator for monitoring the angular position of the steering wheel, and road wheel motor actuators which are controlled by controllers in response to tracking the sensed angular displacement of the hand wheel from a central position. In contrast to prior steering systems, the steer-by-wire steering system does not employ a mechanical linkage between the steering wheel and the individual road wheels. Exemplary of such known steer-by-wire systems is commonly-assigned U.S. Pat. No. 6,176, 341, issued Jan. 23, 2001 to Ansari, which is wholly incorporated herein by reference.

Prior art hand wheel actuators typically include a number of components including a hand wheel actuator, an electronic control unit, and a road wheel actuator. The hand wheel actuator includes sensors and motors for sensing the position of the hand wheel and/or torque transmitted through the steering shaft. The hand wheel actuator also includes an electric motor, which provides feedback to the driver and a agreeable steering feel. Thus, the hand wheel actuator and the electronic controller are in constant communication.

Previously, the electronic controller was housed in any convenient location behind the dashboard of the vehicle or in the engine compartment. However, this requires additional assembly steps.

Furthermore, as mentioned previously, hand wheel actuators typically include an electric motor to provide feedback to the driver and improve the feel of the hand wheel. Drivers expect hand wheels to have a certain feel that is consistent with a mechanical connection with the road wheels. However, absent such a mechanical connection, aspects of this desired feel must be synthesized. The required feel typically includes some inertia, some friction-related drag, and some centering force that biases the hand wheel toward a center position and a positive stop to limit rotation of the hand wheel to correspond to the limits of rotation of the road wheels. It would be desirable to provide such a mechanical steering feel enhancement device to provide as many aspects of the desired steering feel as possible in order to relieve the electric motor of these tasks. However, prior art mechanical steering feel enhancement devices required extra assembly steps and were therefore cumbersome to install. In addition, prior art return-to-center springs have had the draw back that the force is linearly proportional to displacement. It would be desirable to provide a mechanical steering feel enhancement device that is simple to install or assemble, and provides a satisfactory steering feel.

SUMMARY

The above-discussed and other drawbacks and deficiencies of the prior art are overcome or alleviated by a hand wheel actuator for a steer-by-wire steering system having a steering feel that meets drivers' expectations is provided with a first housing having an aperture, a steering shaft extending through the aperture and rotatably supported by the housing, an electric motor, a position sensor and torque sensor, and a mechanical steering feel enhancement device. The position and torque sensors are positioned within said first housing and configured to detect the angular displacement of the steering shaft and torque applied against the steering shaft respectively. The mechanical steering feel enhancement device is attached to the first housing and provides at least one of a positive stop function, a return-to-center function, or a friction/weight function by mechanical means. The mechanical steering feel enhancement device is in mechanical communication with said steering shaft and is disposed in a second housing and existing as a separate unitary subassembly prior to being installed on said first housing. The electric motor is mounted to one of the first housing and second housing and has an output shaft that is in mechanical communication with the steering shaft for imparting a torque to the steering shaft.

The above-discussed and other features and advantages of the present invention will be appreciated and understood by those skilled in the art from the following detailed description and drawings, in which:

FIG. 5 shows a cross-section view of a first embodiment of a hand wheel actuator incorporating the driver interface electronic module of FIGS. 3 and 4;

FIG. 6 shows a front view of a stop gear of the hand wheel actuator of FIG. 5;

FIG. 9 shows a cross-section view of a hand wheel actuator having a constant-force spring;

FIG. 10 shows a diagram depicting the operation of the constant-force spring of the actuator shown in FIG. 9;

DETAILED DESCRIPTION OF THE PREFERRED EMBODIMENTS

Figures 1, 2:
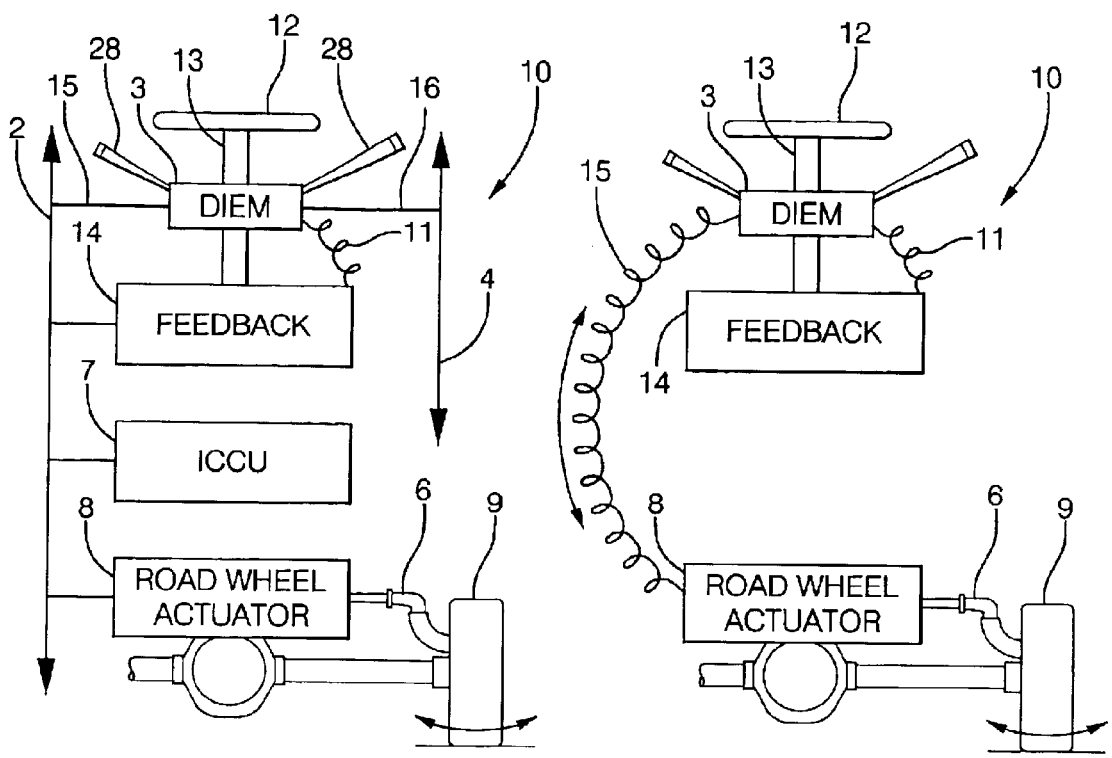
FIG. 1 shows a first schematic diagram of a steer-by-wire system.
FIG. 2 shows a second schematic diagram of a steer-by-wire system.

FIG. 1 shows a schematic representation of a steer-by-wire system comprising a hand wheel actuator 10, road wheel actuator 8, and data bus 2. Road wheel actuator 8 controls the steering position of road wheel 9 by means of a tie-rod 6. Hand wheel actuator 10 comprises a hand wheel 12 connected via a steering shaft to a feedback device 14 that provides driver feedback. Torque and position sensors are mounted to driver interface electronic module (DIEM) 3, which also includes the electronic control unit for controlling road wheel actuator 8 via data bus 2 and feedback device 14 via wiring 11. Signals to and from road wheel actuator 8 are multiplexed on data bus 2 as is known in the field of distributed (networked) control. By utilizing a network rather than direct signal lines as known in the prior art, the steer-by-wire system may be integrated into an overall chassis control system including an integrated chassis control unit (ICCU) 7, which may include, active braking control, active suspension, active roll, and vehicle state sensors including, but not limited to, yaw rate, lateral acceleration, and roll rate. Plural data busses 2 may be provided for redundancy while still reducing the overall number of wiring connections required.

The second communication bus 4 provides interface and data exchange with non-chassis systems such as the main electrical system, vehicle diagnostics, and multi-media systems. Thus displays and controls incorporated into DIEM 3 can communicate with these auxiliary systems via second communications bus 4.

FIG. 2 shows an alternative embodiment of a steer-by-wire system in which data bus 2 is replaced with signal lines 15. Because the electronic control unit for the steer-by-wire system is incorporated into DIEM 3, extra steps required for installing the electronic control unit separately are not required.

Figures 3, 4:
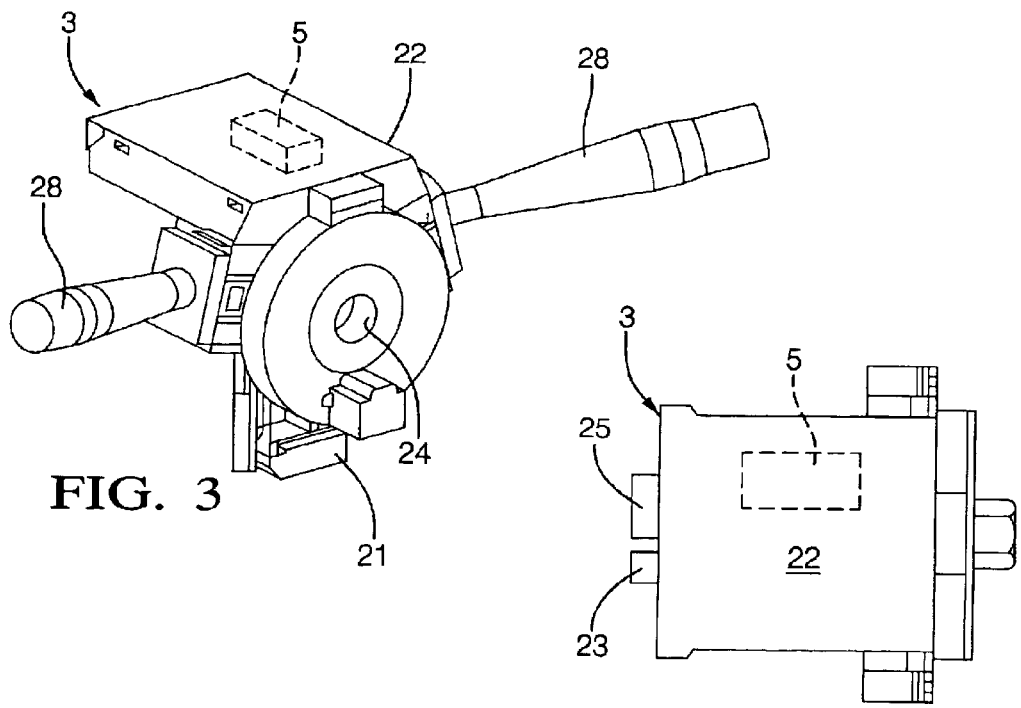
FIG. 3 shows a perspective view of a driver interface electronic module.
FIG. 4 shows a plan view of a driver interface electronic module.

DIEM 3 will now be described in more detail with reference to FIGS. 3 and 4. DIEM 3 is an electronic control center that includes a control module 22 that houses various control electronics including an electronic control unit 5 for the steer-by-wire system as described above. DIEM 3 is designed to be positioned just behind hand wheel 12 (FIGS. 1, 2) and is mounted within a steering shaft housing (not shown) and includes a hole 24 through which a steering shaft 13 passes, permitting position and torque sensors (further described below) to be mounted to DIEM 3, thereby further reducing complexity of assembly. DIEM 3 is modular, in that it exists as a subassembly prior to being mounted on steering shaft housing 30, thereby providing a simpler assembly than mounting each component included in DIEM 3 individually. Further information regarding DIEM 3 is available in commonly-assigned U.S. patent application Ser. No. 09/858,236 entitled, "Distributed Control Architecture For Mechatronic Automotive Systems" and filed May 15, 2001 by Scott A. Milisap, et al., now U.S. Pat. No. 6,522,962, and which is wholly incorporated herein by reference.

One or more multi-function stalk switches 28 are connected to DIEM 3 to allow the driver to control various aspects of the vehicle, such as, for example, turn signals, headlights, windshield wipers, cruise control, entertainment system, etc., as is generally known in the art. An electrical connector 21 may be provided for connection to the vehicle horn and airbag actuator. Actuation of the various controls generates output signals via connector 23 to signal line 16 and multiplexed data bus 4 (FIG. 1) so that the proper vehicle component will receive the driver's instructions and be able to respond appropriately. Alternatively, signal lines to and from driver interface controls may be passed directly to the associated component via a wiring harness (not shown) as is generally known. As will be further described below, DIEM 3 also includes at least torque and at least one position sensor to detect the position of hand wheel 12 and torque on steering shaft 13. This information is processed within control module 22 which includes an electronic control unit 5 for the steer-by-wire system as described above. Signals to and from road wheel actuator 8 are transmitted via connector 25, signal line 15, and data bus 2 as described above with respect to FIG. 1. Alternatively, such signals are passed directly to and from road wheel actuator Electronic control unit 5 may be integrated with the various other functions of control module 22 discussed above or it may include distinct electronics. Furthermore, multiple electronic control units 5 (only one shown) may be provided for redundancy.

FIG. 5 shows a first embodiment of a hand wheel actuator 10 for a steer-by-wire system. A steering shaft is mounted for rotation on bearings 32 within steering shaft housing 30. Top end 33 of steering shaft 13 is adapted to be attached to a hand wheel 12 (see FIGS. 1, 2). DIEM 3 is attached to steering shaft housing 30 adjacent to a top end 33 of steering shaft 13 so that it is positioned just behind hand wheel 12 in use (as shown in FIGS. 1, 2). DIEM 3 includes a position sensor 36, a torque sensor 34 accurately supported over shaft 13 by bearings 31, and control module 22. Plural sensors may be provided for redundancy (not shown). Torque sensor 34 is a non-compliant type torque sensor that does not require a torsion bar. Steering shaft 13 includes section 17 connected via pins 39 into steering shaft 13. Section 17 provides a predictable response to torque, which is measured by non-compliant torque sensor 34 in the known manner. For more information on this technology, please refer to U.S. patent application Ser. No. 09/825,794 entitled, "Steering Column With Non-Compliant Torque Sensor" filed Apr. 4, 2001 by Ratko Menjak, and now U.S. Pat. No. 6,655,493, and is wholly incorporated herein by reference.

Motor 40 provides the motive force of feedback to the driver operating hand wheel 12. Motor 40 is connected via transmission 45 to steering shaft 13. Transmission 45 includes a motor pulley mounted onto or formed into the output shaft of motor 40, a pulley 46 fixed to shaft 13, and a belt 44 extending around motor pulley 42 and pulley 46, thereby placing motor 40 into mechanical communication with steering shaft 13.

Steering shaft housing 30 also includes a steering enhancement device in the form of positive stop mechanism 50. Positive stop mechanism 50 engages a pinion 151 attached to or formed into steering shaft 13. Pinion 151 engages stop gear 153 mounted onto pin 155 for rotation about its axis. Pin 155 is supported by housing portion 152. Stop gear 153 includes teeth for engaging pinion 151 and stop tooth 154 (see FIG. 6) for limiting rotation of stop gear 153 and pinion 151, and therefore steering shaft 13. Preferably, though not necessarily, pinion 151 and stop gear 153 are sized to permit steering shaft 13 to rotate 540° (1½ revolutions) in either direction from a central position. By incorporating positive stop mechanism into steering shaft housing 30, fewer assembly steps are required during manufacture of hand wheel actuator 10.

Return-to-center device 90 comprises a spring-loaded ball-screw mechanism connected to a lower end of steering shaft 13 for providing a biasing torque against steering shaft 13 that biases steering shaft 13 towards the center position. Details of the operation of this type of return-to-center device is provided in commonly-assigned U.S. patent application Ser. No. 10/068,703 filed Feb. 4, 2002 by Ratko Menjak et al., now Publication No. 2003-0146037, which is wholly incorporated herein by reference.

Each of motor 40, positive stop mechanism 50, and return-to-center device 90 contribute to driver feed-back sensations. Mechanical feedback devices such as positive stop mechanism 50 and return-to-center device 90 reduce load and power requirements of motor 40. For example, a return-to-center device 90 provides a biasing force to return the steering wheel to a central position while electric motor and transmission 45, which may include gear reduction means, provides feedback from the road wheels to the hand wheel. A stronger electric motor 40 may eliminate the need for gear reduction in transmission 45. For closed-loop control of motor 40, it is necessary that motor 40 be in mechanical communication with steering shaft 13 on a side of torque sensor 34 opposite of hand wheel 12. However, positive stop mechanism and return-to-center device may be on either side of torque sensor 34.

Figure 7:
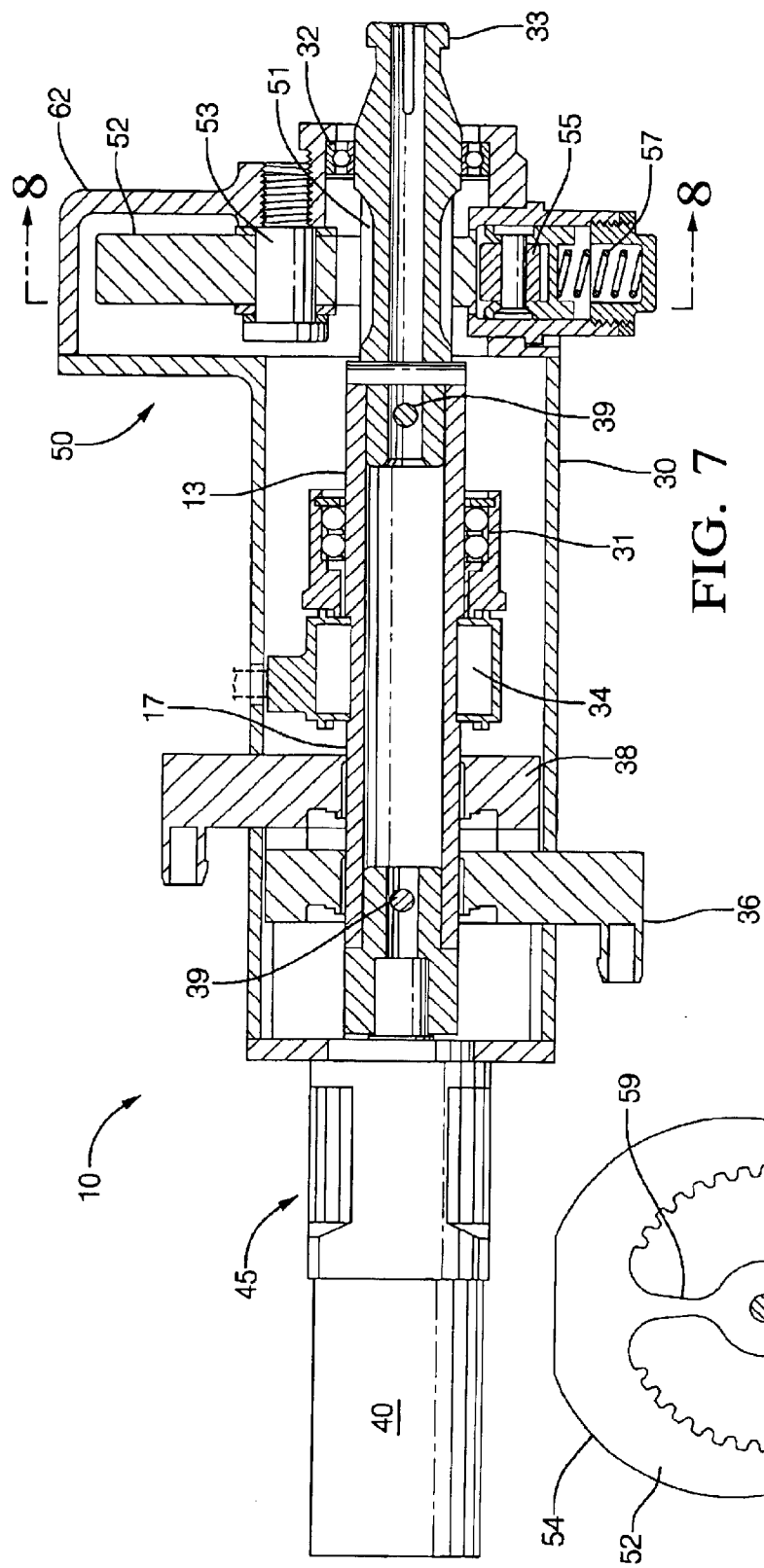
FIG. 7 shows a second embodiment of a hand wheel actuator.
Figure 8:
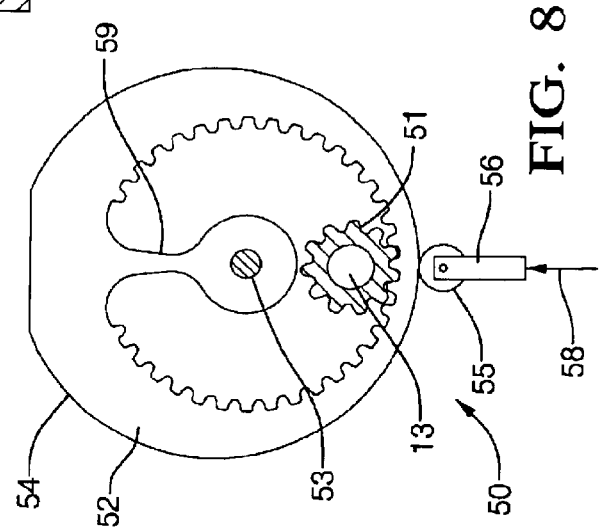
FIG. 8 shows a front view of a return-to-center and steering feel enhancement device of the hand wheel actuator of FIG. 7.

FIGS. 7 and 8, e.g., show a second embodiment of a hand wheel actuator 10. In this device, DIEM 3 (not shown) may be attached at top end 33 of steering shaft 13. In this embodiment, however, redundant position sensors 36, 38 and non-compliant torque sensor 34 are integrated in a single housing 30 with positive stop mechanism 50, which is positioned between top end 33 and section 17, the latter being coupled to non-compliant torque sensor 34 for sensing applied torque.

Positive stop mechanism 50 includes housing 62 that is attached to steering shaft housing 30 in a conventional manner. Positive stop mechanism 50 comprises a pinion 51 formed or attached to steering shaft 13, the pinion 51 engaging an inside gear 52 as seen in FIG. 8. Inside gear 52 rotates on shaft 53 supported by housing 62, shaft 53 being positioned parallel and adjacent to steering shaft 13. Inside gear 52 includes a sloped outer surface 54 that interacts with roller cam 55 to provide a return-to-center function and improved steering feel. Roller 55 supported by roller support 56, which includes a housing and compression spring 57 for biasing roller cam 55 against sloped outer surface 54. As steering shaft 13 rotates, pinion 51 causes inside gear 52 to rotate on shaft 53. Sloped surface 54 forces roller cam 55 out, causing spring 57 to compress. When inside gear 52 rotates close to 180°, pinion 51 engages stop surface 59, thereby preventing further rotation of either the inside gear 52 or pinion 51 and thereby providing a positive stop function.

Pinion 51 and inside gear 52 are preferably sized to permit the steering shaft 13 to rotate one and one-half turns in either direction from a centered direction, though other amounts are possible. The force of roller cam 55 against sloped outer surface 54 caused by spring 57 generates a torque against inside gear 52, which provides a return-to-center function against steering shaft 13. Use of a roller cam 55 improves steering feel, and by shaping the sloped outer surface 54, the torque profile of the return-to-center function can be customized. For example, a uniform torque can be provided, or the torque can be increased at the extremes of rotation by increasing the slope with respect to the tangent at either end of the rotation. Furthermore, it should be noted that the position of roller cam 55 with respect to pinion 51 need not be aligned; the roller cam may be positioned at any convenient location along the circumference of the inside gear 52, with the understanding that the sloped outer surface must also be adjusted to accommodate the location of roller cam 55 for returning the steering shaft to a center location.

Assembly of positive stop mechanism simply requires fitting housing 62 having inside gear 52 and roller cam and roller support 56 preassembled thereto over steering shaft top end 33 and attaching housing 62 to steering shaft housing 30 so that inside gear 52 engages pinion 51.

Motor 40 is coupled via transmission 45, which may include a planetary gear set to reduce the turning ratio, to a lower end of steering shaft 13. Note that torque sensor 34 will only detect torque exerted against motor 40. Redundant position sensors 36, 38 are positioned on steering shaft 13 between non-compliant torque sensor 34 and transmission 45.

FIGS. 9 and 10 show an embodiment of a hand wheel actuator 10 incorporating a constant-force spring 80. Shown here is a hand wheel actuator similar to previous embodiments having steering shaft 13 with a DIEM 3 positioned at top end 33 of shaft 13 and motor 40 engaging steering shaft 13 via transmission 45 at a bottom end thereof. DIEM 3 includes position sensors and a non-compliant torque sensor as discussed above with respect to the first embodiment shown in FIG. 5. Positioned on a lower portion 48 of steering shaft 13 intermediate of DIEM 3 and transmission 45 is steering return/resistance device 70.

Steering return/resistance device 70 is incorporated into steering shaft housing 30 and includes an auxiliary shaft 78 in mechanical communication with steering shaft 13 via a first pulley 71 attached to or formed into shaft 13, a second pulley 75 attached to or formed into auxiliary shaft 78, and a belt 73 engaging both the first pulley 71 and second pulley 75. Belt 73 is preferably a timing belt, i.e., has teeth or cogs that mate with mating formations on first and second pulleys 71, 75, for maintaining a constant turn ratio between first and second pulleys 71, 75. Auxiliary shaft 78 is supported on ball bearings positioned at either end of auxiliary shaft 78. Fixed or otherwise formed on shaft 78 is a first spool 82 upon which a length of constant force spring 80 is wound. An additional length of constant force spring 80 is wound on second spool 84, which is fixed or otherwise formed into steering shaft 13.

Constant force spring 80, when not stressed, appears as shown in profile in FIG. 10 in a central position in which a first segment is spiral shaped, a second central segment is relatively straight, and a third segment is spiral shaped. As the relatively straight central segment is wound on either first spool 82 or second spool 84, it exerts a torque against the pulley tending the pulley back to the unstressed central position, thereby providing an effective return-to-center function. Each end of constant force spring 80 is fixed to a respective one of the spools. When steering shaft 13 reaches a limit of rotation, e.g., 540° or one and one-half revolution from the central position, the constant force spring is completely unwound from one of the spools, thereby preventing further rotation. In addition to providing a return-to-center function, constant force spring 80 enhances the overall steering feel felt by the driver, and approximates a driver's expectations.

Other variations on the use of the constant force spring can be envisioned. For example, belt 73 may be replaced with a chain. Alternatively a pair of mating gears can be used to provide mechanical communication between steering shaft 13 and auxiliary shaft 78. In this case, the constant force spring would be wound in opposite directions around the spools because the relative motion of the gears would require it.

Figure 11:
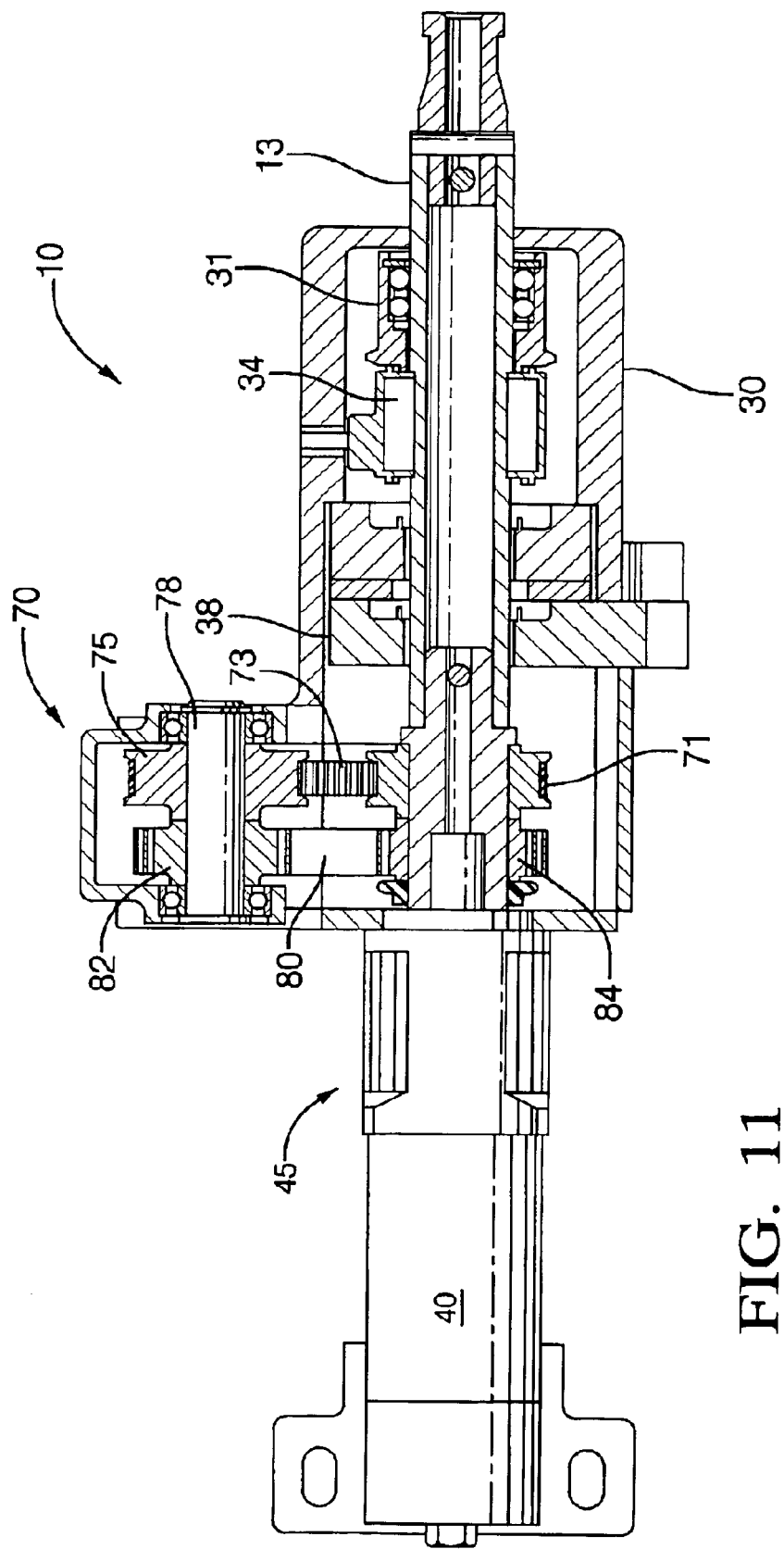
FIG. 11 shows a cross-section view of another embodiment of a hand wheel actuator having a constant-force spring.

FIG. 11 shows another embodiment of a hand wheel actuator 10 having a steering return/resistance device 70. In this case, as with the second embodiment discussed above with respect to FIGS. 7 and 8, DIEM 3 does not include torque or position sensors, or includes only position sensors. Instead, redundant position sensors 36, 38 and non-compliant torque sensor 34 are integrated in a single housing 30 with steering return/resistance device 70. Steering return/resistance device 70 is essentially the same as previously discussed with respect to FIGS. 9 and 10.

Figure 12:
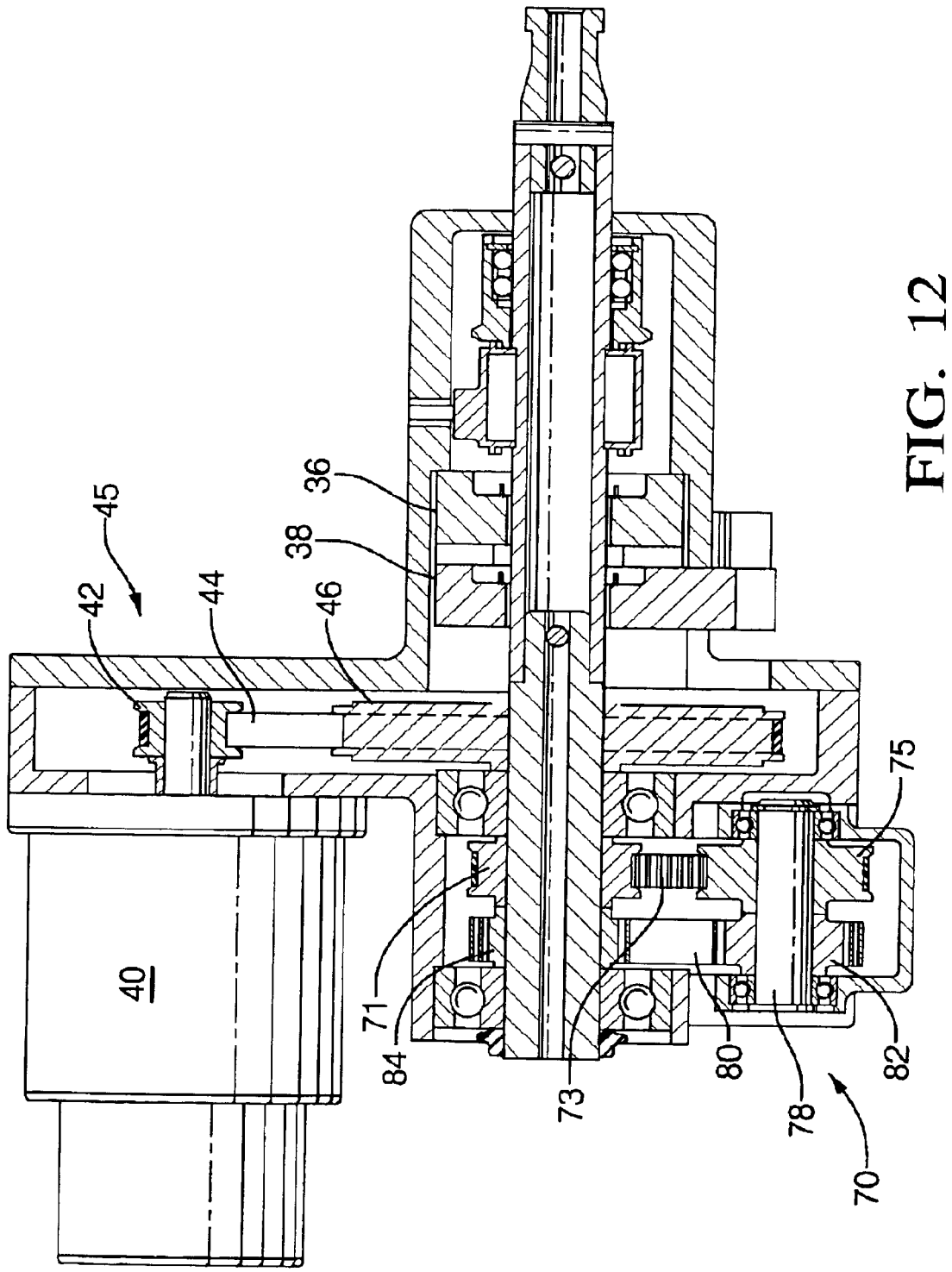
FIG. 12 shows yet another embodiment of a hand wheel actuator having a constant-force spring.

FIG. 12 shows yet another embodiment of a hand wheel actuator 10. This embodiment is similar to the previous embodiment shown in FIG. 11 with the only difference being a relocation of motor 40 from the lower end of shaft 13. In this embodiment, shaft 13 includes a pulley 46 positioned on steering shaft 13 intermediate of position sensors 36, 38 and steering return/resistance device 70. A belt 44 extends between pulley 46 and a small pulley 42 positioned on an output shaft of motor 40. Transmission 45 therefore comprises a belt transmission assembly for conveying torque from motor 40 to steering shaft 13.

While preferred embodiments have been shown and described, various modifications and substitutions may be made thereto without departing from the spirit and scope of the invention. Terms such as "first" and "second" are used herein merely to distinguish between two like elements, and are not intended to imply an order such as of importance or location. It is to be understood that the present invention has been described by way of illustration only, and such illustrations and embodiments as have been disclosed herein are not to be construed as limiting to the claims.

What is claimed is:

1. A hand wheel actuator for a steer-by-wire steering system comprising:
   a first housing having an aperture;
   a steering shaft extending through said first housing, said steering shaft having an upper end adapted for attaching a hand wheel, and a lower end opposite said upper end, said steering shaft being rotatably supported by said first housing;
   a position sensor and a non-compliant torque sensor, each positioned within said first housing and configured to detect the angular displacement of the steering shaft and torque applied against the steering shaft respectively;
   a mechanical steering feel enhancement device attached to said first housing, said mechanical steering feel enhancement device providing at least one of a positive stop function, a return-to-center function, or a friction/weight function by mechanical means, said mechanical steering feel enhancement device being in mechanical communication with said steering shaft, and said mechanical steering feel enhancement device being disposed in a second housing and existing as a separate unitary subassembly prior to being installed on said first housing; and
   an electric motor mounted to one of said first housing and second housing, said electric motor having an output shaft in mechanical communication with said steering shaft for imparting a torque to said steering shaft;
   wherein said torque sensor is positioned between the upper end of the steering shaft and a location at which the motor applies torque to the steering shaft and wherein said first housing separates and shields said non-compliant torque sensor from magnetic fields generated by said electric motor.

2. The hand wheel actuator of claim 1 wherein said mechanical steering feel enhancement device comprises a positive stop, said positive stop limiting travel of said hand wheel to a preselected angular displacement in either direction from a central position.

3. The hand wheel actuator of claim 2 wherein said positive stop is a positive stop mechanism and comprises an inside gear engaging a pinion on said steering shaft, said inside gear having an axis of rotation substantially parallel to said steering shaft, said inside gear further having a stop surface extending from a hub of said inside gear to a perimeter, said stop surface engaging said pinion at limits of rotation of said steering shaft, said inside gear including a sloped outer surface which engages a roller cam, said roller cam being biased by a spring substantially radially towards said axis of rotation of said step inside gear, said sloped surface and said roller cam interacting to provide a return-to-center function for said positive stop mechanism.

4. The hand wheel actuator of claim 1 wherein said steering feel enhancement device comprises a steering return/resistance device implementing a constant-force spring, said steering return/resistance device including an auxiliary shaft disposed substantially in parallel with said steering shaft, said auxiliary shaft being in mechanical communication with said steering shaft, said steering return/resistance device further comprising:
   a first spool on said auxiliary shaft;
   a second spool on said steering shaft, said constant force spring having a first end fixed to said first spool and a second end fixed to said second spool, said constant force spring extending between said first spool and said second spool.

5. A hand wheel actuator for a steer-by-wire steering system comprising:
   a steering shaft, said steering shaft having an upper end adapted for attaching a hand wheel, and a lower end opposite the upper end;
   a steering shaft housing, said steering shaft extending through said steering shaft housing and rotatably supported by said steering shaft housing, said steering shaft housing containing a mechanical steering feel enhancement device in mechanical communication with said steering shaft;
   a driver interface electronics module attached to an upper end of said steering shaft housing, said driver interface electronics module comprising a control unit, and driver interface controls including a stalk-mounted switches; said driver interface electronics module existing as a subassembly prior to being mounted on said steering shaft housing;
   a position sensor and a non-compliant torque sensor, each positioned within the handwheel actuator and configured to detect the angular displacement of the steering shaft and torque applied against the steering shaft respectively;
   an electric motor and a transmission placing said electric motor and said steering shaft in mechanical communication, said electric motor being attached to a lower portion of said steering shaft housing opposite said driver interface electronics module;
   wherein said torque sensor is positioned between the upper end of the steering shaft and a location at which the motor applies torque to the steering shaft and wherein the housing separates and shields the torque sensor from magnetic fields generated by said electric motor.

6. The hand wheel actuator of claim 5 wherein said driver interface electronics module includes a non-compliant torque sensor, said steering shaft extending through said non-compliant torque sensor when attaching said driver interface electronics module onto said steering shaft housing.

7. The hand wheel actuator of claim 5 wherein said control unit is in communication with said position sensor and a road wheel actuator, said control unit signaling said road wheel actuator to steer road wheels in response to rotations of the steering shaft sensed by said position sensor.

8. The hand wheel actuator of claim 7, driver interface electronics including a torque sensor; said control unit and said torque sensor being in electronic communication so that said control unit receives torque signals generated by said torque sensor, said torque signals being representative of torsion of the steering shaft; said control unit also receiving force signals from said road wheel actuator, said force signals being representative of force exerted against said steering system, wherein said control unit drives said motor in response to said force signals and said torque signals.

9. The hand wheel actuator of claim 5 wherein said mechanical steering feel enhancement device comprises a positive stop, said positive stop limiting travel of said hand wheel to a preselected angular displacement in either direction from a central position.

10. The hand wheel actuator of claim 9 wherein said positive stop comprises a stop gear engaging a pinion on said steering shaft, said stop gear having a stop tooth preventing engagement thereby by said pinion such that said pinion and said steering shaft are limited by said stop tooth to a selected amount of angular displacement.

11. The hand wheel actuator of claim 9 wherein said positive stop is a positive stop mechanism comprises an inside gear engaging a pinion on said steering shaft, said inside gear having an axis of rotation substantially parallel to said steering shaft, said inside gear further having a stop surface extending from a hub of said inside gear to a perimeter, said stop surface engaging said pinion at limits of rotation of said steering shaft.

12. The hand wheel actuator of claim 11 wherein said inside gear includes a sloped outer surface which engages a roller cam, said roller cam being biased by a spring substantially radially towards said axis of rotation of said inside gear, said sloped surface and said roller cam interacting to provide a return-to-center function for said positive stop mechanism.

13. The hand wheel actuator of claim 5 wherein said steering feel enhancement device comprises a steering return/resistance device implementing a constant-force spring.

14. The hand wheel actuator of claim 13 wherein said steering return/resistance device includes an auxiliary shaft disposed substantially in parallel with said steering shaft, said auxiliary shaft being in mechanical communication with said steering shaft, said steering return/resistance device further comprising:

a first spool on said auxiliary shaft;

a second spool on said steering shaft, said constant force spring having a first end fixed to said first spool and a second end fixed to said second spool, said constant force spring extending between said first spool and said second spool.

15. The hand wheel actuator of claim 14 further comprising a first pulley on said steering shaft, a second pulley on said auxiliary shaft, and a belt extending from said first pulley to said second pulley thereby placing said auxiliary shaft in mechanical communication with said steering shaft.

16. The hand wheel actuator of claim 15 wherein said belt is a timing belt and has teeth engaging mating structures on each of said first pulley and said second pulley, thereby maintaining a constant turn ratio between said first pulley and said second pulley.

\* \* \* \* \*